…

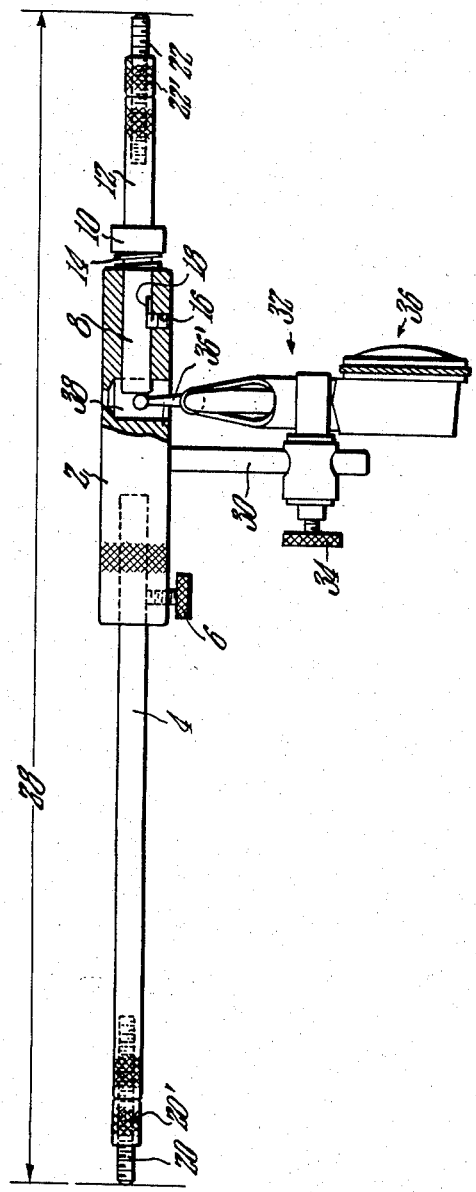

United States Patent Office 2,873,533
Patented Feb. 17, 1959

2,873,533

INSIDE DIAMETER COMPARATOR

George D. Wilson, Holyoke, Mass.

Application December 19, 1957, Serial No. 703,824

2 Claims. (Cl. 33—147)

This invention relates to improvements in precision tools and is directed more particularly to tools for comparing the diameter of an internal bore or cylinder with a predetermined dimension or standard.

The principal object of the invention is the provision of a tool which is adjustable to conform to a predetermined dimension or standard. That is, in various internal boring, grinding and other operations, it is often required and necessary to produce an internal bore of predetermined accurate diameter.

During machining operations, various tools such as calipers, micrometers, and other inside tools incorporating micrometers, are inserted in the bore for determining dimensions. Such tools not only are cumbersome and bulky so that difficulty is encountered in inserting them into a bore but also require manual manipulation or adjustment when in the bore, and such to a large extent depends on the sense of feel of the workman, and the result leads to frequent inaccuracies in the work.

According to the novel features of this invention, a tool is provided which is simple in its form, rigid in its construction and readily insertable into a bore. The tool is such that it is readily adjusted to the diameter that is desired for the bore. For its measuring function, there are no manual adjustments to be made so that accuracy is in no way dependent on the sense of feel as with prior art tools.

Various changes and modifications may be made within the spirit and scope of the invention which will hereinafter be described in the present preferred form thereof.

In the drawings;

Fig. 1 is a side elevational view of a tool embodying the novel features of the invention; and Fig. 2 is a plan view of the dial gauge of the tool.

Referring now to the drawings more in detail, the invention will be described in detail.

An elongated body 2 is provided which is adapted to receive dimension bars, such as 4, in one end thereof. A screw 6 in threaded engagement with the body is adapted to secure the bars, such as 4, therein.

There may be a plurality of bars, such as 4, in different lengths. The bars may be of one, two, three, four inches in length, and so on.

A plunger 8 is reciprocable in the opposite end of the body 2, and has a flange 10 from which extends a dimension bar 12. A spring 14 between the end of the body 2 and flange 10 urges the bar 12 outwardly of the body.

A set screw 16 in threaded engagement with the body 2 has an inner end disposed in a flat groove 18 at the side of the plunger 8 to prevent displacement of the plunger from the body.

Screws 20 and 22 are in threaded engagement with outer ends of the bars 4 and 12, and will preferably have crowned outer end faces, as shown. Said screws 20 and 22 may be called sizing screws. Lock nuts 20' and 22' on the screws 20 and 22 respectively are adapted to abut the ends of the bars 4 and 12, and to lock the screws in longitudinally adjusted positions.

Where a bore is to have a predetermined diameter, one or both of the sizing screws are adjusted and locked in place so that the dimension 28 over the crowned faces of the screws is that of the predetermined dimension of the bore. The screws 20 and 22 will be formed with relatively fine threads whereby it will be possible to set the screws to a certain dimension with extreme accuracy.

The dimension 28 may be established as by size blocks or by any convenient and well known manner.

A post 30 extends outwardly from the body 2, and transverse to the longitudinal axis of the bars 4 and 12, and a dial gauge 32 of well known form is clamped thereto by a clamp screw 34. The dial 36 of the gauge is shown in Fig. 2.

The usual swingable lever 36' of the dial gauge extends into a transverse bore 38 of the body, and is engageable by the inner end of the plunger 8.

With the bar such as 4 of the proper length and secured in the body, the screws 20 and 22 are adjusted and locked in place to obtain the predetermined dimension or diameter of the bore being worked upon.

When the bore is very nearly up to size, the tool is inserted therein. With screw 20 against one side of the wall of the bore, the screw 22 will be acted upon by the opposite wall to move the plunger 8 inwardly for swinging the lever 36' of the gauge, which, as is common with gauges, rotates, through the gauge mechanism, the pointer or indicator 40 thereof.

The dial of the gauge, as usual, is rotatable relative to the pointer 40. The zero thereof may be registered with the pointer when the dimension bars are relatively extended to the predetermined dimension 28. In such a case, when the bore is of the predetermined dimension, the pointer and zero of the dial will be in register.

The gauge may be used in such manner as will be convenient for the operator in determining the characteristics of the bore.

It will be noted that the tool is such that an internal bore may be easily and readily compared with a desired predetermined dimension, and the tool is readily and easily adjusted to a dimension so as to be accurate within very fine limits.

The tool may be inserted in a bore without difficulty, and there are no manual adjustments to be made of the tool within a bore which are dependent upon the sense of feel.

Various changes and modifications may be made in the form of the tool without departing from the spirit and scope of the invention, and therefore, it is desired to be limited, if at all, by the appended claims, rather than the foregoing description.

I claim:

1. A tool of the class described comprising in combination, an elongated body, a dimension bar secured in and extending from one end of said body, a plunger reciprocable in an opposite end of said body and having a flange outside the said opposite end of said body and a dimension bar extending outwardly therefrom, said plunger and dimension bars being in axial alignment, sizing screws adjustable in the outer ends of said dimension bars and having outer crowned ends and being on the longitudinal axes of said bars, nuts on said screws for abutting outer ends of said bars for locking said screws in adjusted positions, a post for a dial gauge fixed to and extending outwardly from said body transversely relative to the axes of said bars, said body provided with a bore to receive the actuating lever of a dial gauge for engagement with the inner end of said plunger, a spring between said opposite end of said body and flange for urging said plunger outwardly, and means limiting outward movements of said plunger.

2. A tool of the class described comprising in combination, an elongated body, a dimension bar secured in and extending from one end of said body, a plunger reciprocable in an opposite end of said body having a flange outside said opposite end of said body and a dimension bar extending outwardly therefrom, said plunger and bars being in axial alignment, sizing screws adjustable in outer ends of said bars having outer crowned ends and being on the longitudinal axes of said bars, nuts on said screws for abutting outer ends of said bars for locking said screws in adjusted positions, a post for a dial gauge fixed to and extending outwardly from said body transversely relative to the axes of said bars, said body provided with a bore to receive the actuating lever of a dial gauge for engagement with the inner end of said plunger, a spring between said opposite end of said body and flange for urging said plunger outwardly, means limiting outward movements of said plunger, and a dial gauge secured to said post having an actuating lever in the bore of said body engageable by the inner end of said plunger.

References Cited in the file of this patent

UNITED STATES PATENTS

| 1,557,846 | Kallensee | Oct. 20, 1925 |
| 1,740,695 | Johansson | Dec. 24, 1929 |

OTHER REFERENCES

Publication, American Machinist, Feb. 13, 1935, page 182. (Copy in Library.)